United States Patent
Fanghaenel et al.

(10) Patent No.: US 11,099,771 B2
(45) Date of Patent: Aug. 24, 2021

(54) SYSTEM AND METHOD FOR EARLY REMOVAL OF TOMBSTONE RECORDS IN DATABASE

(71) Applicant: salesforce.com, inc., San Francisco, CA (US)

(72) Inventors: Thomas Fanghaenel, Oakland, CA (US); Terry Chong, Pleasanton, CA (US); Jameison Bear Martin, Oakland, CA (US)

(73) Assignee: salesforce.com, inc., San Francisco, CA (US)

( * ) Notice: Subject to any disclaimer, the term of this patent is extended or adjusted under 35 U.S.C. 154(b) by 334 days.

(21) Appl. No.: 16/139,717

(22) Filed: Sep. 24, 2018

(65) Prior Publication Data

US 2020/0097205 A1    Mar. 26, 2020

(51) Int. Cl.
*G06F 16/00* (2019.01)
*G06F 3/06* (2006.01)
*G06F 16/215* (2019.01)
*G06F 16/30* (2019.01)

(52) U.S. Cl.
CPC .......... *G06F 3/0652* (2013.01); *G06F 3/0608* (2013.01); *G06F 3/0638* (2013.01); *G06F 3/0671* (2013.01); *G06F 16/215* (2019.01)

(58) Field of Classification Search
None
See application file for complete search history.

(56) References Cited

U.S. PATENT DOCUMENTS

| | | | | |
|---|---|---|---|---|
| 5,887,275 A * | 3/1999 | Nguyen | ................... | G06F 12/10 711/206 |
| 6,219,678 B1 * | 4/2001 | Yelland | ............... | G06F 12/0253 |
| 8,600,949 B2 * | 12/2013 | Periyagaram | ......... | G06F 3/0641 707/664 |
| 9,047,312 B1 * | 6/2015 | Ten-Pow | ............... | G06F 16/174 |
| 9,400,816 B1 * | 7/2016 | Gubarev | ............. | G06F 16/2228 |
| 9,817,587 B1 * | 11/2017 | Leshinsky | ............... | G06F 3/064 |
| 10,552,387 B1 * | 2/2020 | Donohue | .............. | G06F 16/215 |
| 10,795,871 B2 * | 10/2020 | Velayudhan Pillai | | G06F 16/221 |
| 2011/0246503 A1 * | 10/2011 | Bender | ................. | G06F 16/258 707/769 |
| 2013/0198455 A1 * | 8/2013 | Ansaloni | ............. | G06F 12/0253 711/118 |
| 2014/0173226 A1 * | 6/2014 | Gold | ...................... | G06F 16/162 711/159 |
| 2014/0195492 A1 * | 7/2014 | Wilding | ................ | G06F 16/215 707/684 |

(Continued)

OTHER PUBLICATIONS

Patrick O'Neil, Edward Cheng, Dieter Gawlick, Elizabeth O'Neil "The log-structured merge-tree (LSM-tree)", 1996, Acta Informatica 33, 351-385 (Year: 1996).*

(Continued)

*Primary Examiner* — Polina G Peach
(74) *Attorney, Agent, or Firm* — Butzel Long; Donald J. Lecher (57) ABSTRACT

A method of deleting tombstones early includes setting an initial-flag in a first record in the storage system, setting a delete-flag in a second record in the storage system, selecting a set of one or more records in the storage system to be written to an extent of the storage system in a merge operation, each of the one or more records being associated with the first key, and performing the merge operation, wherein the second record is not written to the extent during the merge operation based at least in part on a determination that the first record having the initial-flag set is the oldest record in the set and the second record having the delete-flag set is the newest record in the set.

12 Claims, 5 Drawing Sheets

(56) References Cited

U.S. PATENT DOCUMENTS

| | | | | |
|---|---|---|---|---|
| 2014/0279855 | A1* | 9/2014 | Tan | G06F 16/273 707/609 |
| 2016/0142249 | A1* | 5/2016 | Wu | H04L 67/1097 709/222 |
| 2017/0220617 | A1* | 8/2017 | Bortnikov | G06F 16/2329 |
| 2017/0315740 | A1* | 11/2017 | Corsi | G06F 3/0688 |
| 2018/0225321 | A1* | 8/2018 | Boles | G06F 16/9027 |
| 2018/0307711 | A1* | 10/2018 | Kulkarni | G06F 16/2365 |
| 2019/0065621 | A1* | 2/2019 | Boles | G06F 16/22 |
| 2019/0361916 | A1* | 11/2019 | Weaver | G06F 16/2471 |
| 2020/0019623 | A1* | 1/2020 | Wong | G06F 16/9027 |
| 2020/0341889 | A1* | 10/2020 | Idreos | G06F 16/1734 |

OTHER PUBLICATIONS

Wang et al., "An Efficient Design and Implementation of LSM-Tree based Key-Value Store on Open-Channel SSD", Apr. 13-16, 2014, ACM (Year: 2014).*

International Report and Written Opinion for Application No. PCT/US2019/052731, dated Dec. 12, 2019, 15 pages.

Anonymous: "Method of Providing Log Structured Merge (LSM) Trees that Decrease Lifespan of Tombstones", ip.com Journal, ip.com Inc., West Henrietta, NY, US, Aug. 22, 2011 (Aug. 22, 2011), XP013147088, ISSN: 1533-0001.

Russell Sears et al: "Rose", Proceedings of the VLDB Endowment; [ACM Digital Library], Assoc. of Computing Machinery, New York, NY, vol. 1, No. 1, Aug. 1, 2008 (Aug. 1, 2008), pp. 526-537, XP058375987, ISSN: 2150-8097, DOI: 10.14778/1453856. 1453914.

Zhenyu Lu et al: "Optimization of Heterogeneous Databases Data Synchronization in WAN by Virtual Log Compression", Future Networks, 2010.ICFN '10. Second International Conference on, IEEE, Piscataway, NJ, USA, Jan. 22, 2010 (Jan. 22, 2010), pp. 98-101, XP031648876, ISBN: 978-0-7695-3940-9.

International Preliminary Report on Patentability for App. No. PCT/US2019/052731, dated Apr. 1, 2021, 9 pages.

* cited by examiner

SYSTEM AND METHOD FOR EARLY REMOVAL OF TOMBSTONE RECORDS IN DATABASE

BACKGROUND

Data structures are organizations of data that provide a variety of ways to interact with the data stored therein. Data structures can be designed for various purposes, for example, to facilitate efficient searches of the data, such as in a binary search tree, to permit efficient storage of sparse data, such as with a linked list, or to provide efficient storage of searchable data such as with a B-tree.

Data structures that utilize a key-value paradigm accept a key-value pair and are configured to respond to queries for the key. Key-value data structures may include such structures as dictionaries (e.g., maps, hash maps, etc.) in which the key is stored in a list that links (or contains) the respective value. While these structures are useful in-memory (e.g., in main or system state memory as opposed to storage), storage representations of these structures in persistent storage (e.g., on-disk) may be inefficient. Accordingly, a class of log-based storage structures have been introduced. One example is the log structured merge tree (LSM tree).

An LSM tree database may consist of one or more disk-resident immutable layers plus a mutable memory-resident memory layer. When reading from an LSM tree, a reader may read and merge results from all layers. Corresponding index entries are added to the mutable memory-resident layer when a new record is indexed.

Transactions in an LSM tree database are stored as immutable versions of given records. Immutable versions of contents of records already stored on the system may remain unchanged until the contents are deleted (if ever) from the system. That is, a received transaction may create a new version of the contents of the record to be stored in the system, instead of altering the contents of the record. Thus, it may be possible for multiple versions of a record (e.g., records having different contents) to have identical keys except for transaction identifiers (e.g., which may include transaction numbers).

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing the subject disclosure.

The disclosed methods and techniques can be applied to a variety of different database structures. The disclosed subject matter is not limited to a single type of architecture, but for illustrative purposes, the discussion below will describe implementation using a log structured merge (LSM) tree with key-range multi-tenancy. LSM-trees are capable of describing data changes with immutable data versions. Key-range multi-tenancy allows dynamic binding to servers and can be used to keep each tenant's data separate.

Immutable records in an LSM-tree-based storage may be effectively deleted by inserting a 'tombstone' into the storage. A tombstone is a data marker that indicates that the value corresponding to the key has been deleted. A tombstone can be implemented, for example, by setting a designated flag value in a record. The purpose of the tombstone is not only to mark the deletion of the associated value, but also to avoid (or delay) the potentially expensive operation of pruning the value from the tree. Thus, when a tombstone is encountered during a temporally ordered search, the corresponding value is understood to be deleted even if an expired version of the key-value pair resides at an older location within the tree.

Since each version of the physical record in an LSM-tree-based storage is immutable, a record marked for deletion might not be actually deleted for an arbitrarily long period of time that extend for days, months, or years. Within the technological field of database structure, maintenance, and management, this delay can be particularly problematic, especially in database systems that utilize tables with a high number of short-lived records (e.g., a message queue table) in which a large number of tombstones may accumulate over a short period of time. Key-ordered searches in such tables are challenging when large numbers of tombstones accumulate, since key-ordered searches need to read all tombstones in a given key range, so they can all be ignored.

The disclosed embodiments address the technological problem of tombstone accumulation in database structures by changing parameters and implementing rules that, when met, allow for early removal of tombstones from the database structure. The early removal provides numerous improvements, such as reducing the storage of obsolete data in the overall system, increasing the speed of the system, and increasing the speed of sequential scans.

Figure 1:
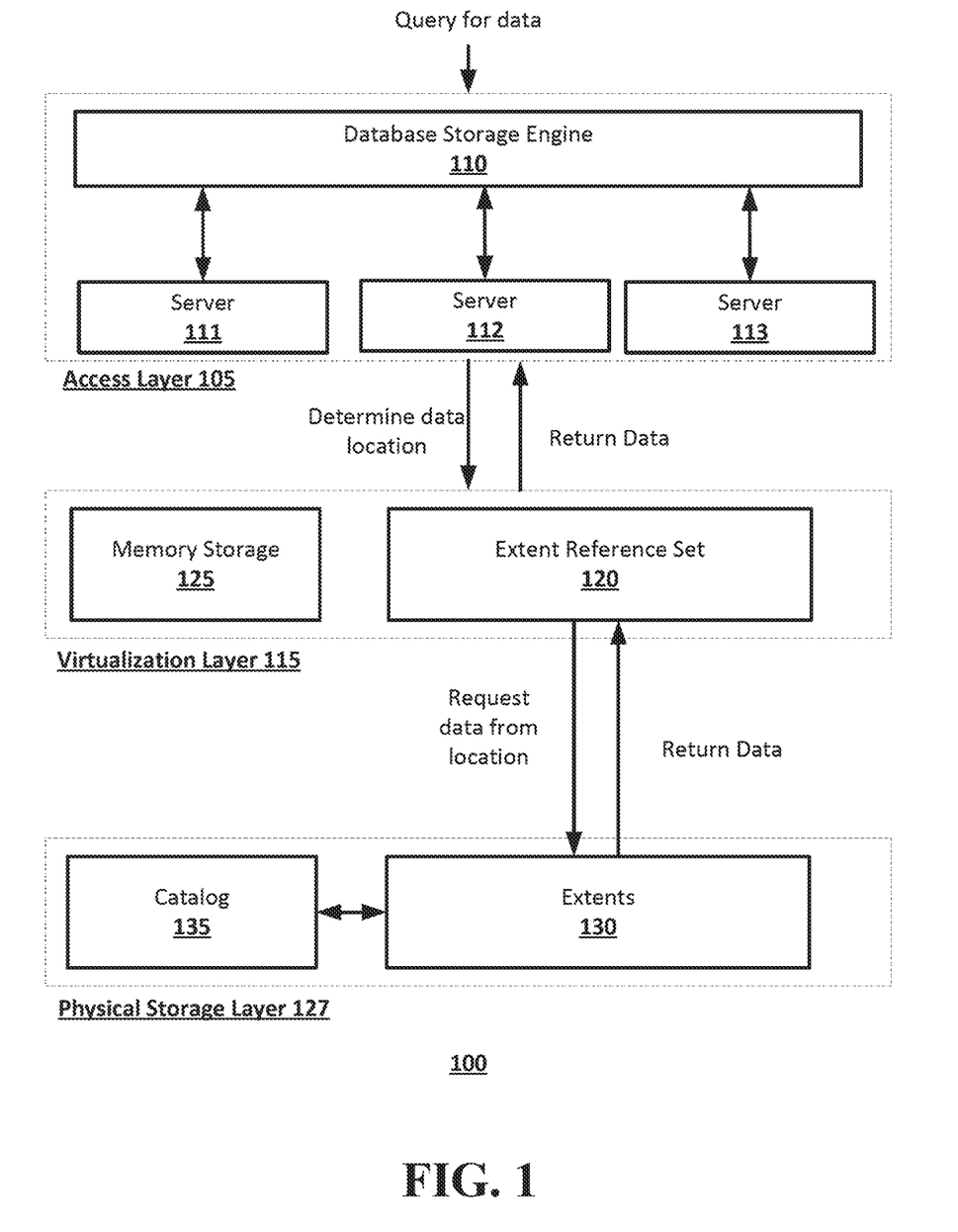
FIG. 1 shows an example database system according to an implementation of the disclosed subject matter.

FIG. 1 shows an example system 100 that can be improved by implementing the disclosed tombstone removal processes. Immutable versions of data are stored in "extents" on the system 100. An "extent" refers to a region of storage, typically continuous within a storage medium, which can be used to store data. As will be described below, an "extent reference" may be used as a logical reference to a physical extent that is stored in a physical storage, and may be used to virtualize access to the physical storage into one or more "levels" in the storage through which data migrates over time as part of database maintenance and optimization processes.

The system 100 can operate on a single computing device or multiple connected computing devices. For example, the system 100 can be implemented on a laptop, a desktop, an individual server, a server cluster, a server farm, or a distributed server system, or can be implemented as a virtual computing device or system, or any suitable combination of physical and virtual systems. For simplicity, various parts such as the processor, the operating system, and other components of the database management system are not shown.

The system 100 can be part of a computing system and network infrastructure, or can otherwise be connected to a separate computing system and network infrastructure, including a larger server network, which can include other server systems similar to system 100. In some implementations, system 100 can be the computer 600, central component 700, and or the second computer 800 shown in FIG. 6, and/or one or more of the database systems 1200a-1200d shown in FIG. 7.

The system 100 includes an access layer 105, a virtualization layer 115, and a physical storage layer 127. The access layer 105 can include one or more servers 111, 112, 113 that provides a platform for tenants to host applications and databases on and functions as a primary interface for users to interact with the system 100. The access layer 105 can also include a database storage engine 110 that can handle load balancing across the servers 111, 112, 113 and can accept and process a query for the system 100 from a computing device (e.g., computer 600 and/or a second computer 800 shown in FIG. 6). For example, the database storage engine 110 can receive a query from a tenant organization and process the query to transmit a command to the virtualization layer 115. The database storage engine 110 can be any suitable combination of hardware and software on the server system 100 for receiving queries for the database system and retrieving data related to the received query.

The virtualization layer 115 virtualizes tenant data to provide each tenant with system services, such as customized databases, that allow the tenant to access only the tenant's own data even though data from multiple tenants may be stored in the system 100. The virtualization layer can include an extent reference set 120 and a memory storage 125. In some implementations, the extent reference set 120 and memory storage 125 can be stored in the central component 700 shown in FIG. 6 and/or database systems 1200a-1200d shown in FIG. 7.

The memory storage 125 stores an initial version of data before the data is recorded to an extent in the physical storage layer 127. That is, data transactions, such as insertion of new records or insertion of tombstones, occur at the memory storage 125 level. Over time, in order to optimize use of the memory storage 125 flush operations transfer data out of the memory storage 125 level to a top level extent 130 in the physical storage level 127, and merge operations transfer data between extents 130 as part of database maintenance operations. In virtualization terms it can thus be said that newer data resides near the "top" of the tree or at the "upper levels" of the database, while older data resides near the "bottom" of the tree, or the "lower levels" of the database. It should be understood, however, that this terminology is merely used as an aid in conceptualization and does not necessarily have any bearing on actual physical location of data relative to each other in the database.

The extent reference set 120 can use metadata from tenant data to define where extents 130 are located in the physical storage physical storage 127 (e.g., where tenant data can be stored as part of extents 130). The metadata can include, for example, key ranges that define which keys are visible in an extent, transaction numbers (herein referred to as "XCN's") that indicate a transaction order of the records/tombstones in the extents 130, and tenant identifier (ID) data that associate the extent with a given tenant. The extent reference set 120 can be implemented using any suitable combination of hardware and software on the server system 100 that can operate to provide the functionality of a logical reference to a physical extent that is stored in physical storage 127.

The virtualization layer 115 can receive a query from the database storage engine 110 and find requested data by checking whether the most recent version of the data is in memory storage 125 or, by referring to the extent reference set 120, checking whether the most recent version of the data has already been flushed to extents 130 in the physical storage layer 127. The query can be received, for example, from an authorized user of the database system that is associated with at least one tenant. If the data has already been flushed to physical storage 127, the virtualization layer 115 can locate the requested data based on metadata in the extent reference set 120. That is, the virtualization layer 115 can retrieve the data requested by the query from the extent 130, and can return the data to the database storage engine 110 which can provide it to, for example, the computing device that transmitted the query to the database system.

The physical storage layer 127 can include an immutable data storage device and can be implemented, for example, as a semiconductor memory, a solid state drive (SSD), hard disk drive, optical memory, an optical storage device, or any other suitable physical data storage medium, or some combination thereof. The physical storage layer 127 can implement the extents 130, which contain the immutable versions of tenant data. The physical storage layer 127 can also include a catalog 135 to manage the identity and lifetime of the extents 130 and track data capacity to manage hardware, such as storage devices and servers that can store the extents.

Since the data in the physical storage 127 is immutable, when the system 100 executes a data transaction to modify stored data, the system 100 creates and inserts a new version of the data into memory storage 125 instead of altering/deleting contents of the already-stored data. Thus, it is possible for multiple versions of data (e.g., each having different contents) as disclosed herein to have identical keys. By using an incremental sequential transactional identifier (XCN) to mark each transaction, the system 100 uses identical keys for versions of data to implement changing of stored data. For example, a later version of a record will have a higher XCN than a previous version of a record, and both records will have identical keys, but potentially different content values.

When the system 100 executes an operation that requires a readout of data, the system 100 can execute a search temporally ordered by XCN. During a search, when a tombstone is encountered the system 100 can disregard any previous records having the same key as the tombstone and a lower XCN than the tombstone. That is, the system will function as if the corresponding value is deleted, even if one or more expired versions of the key-value pair reside at an older location within the extents 130.

Figure 2:
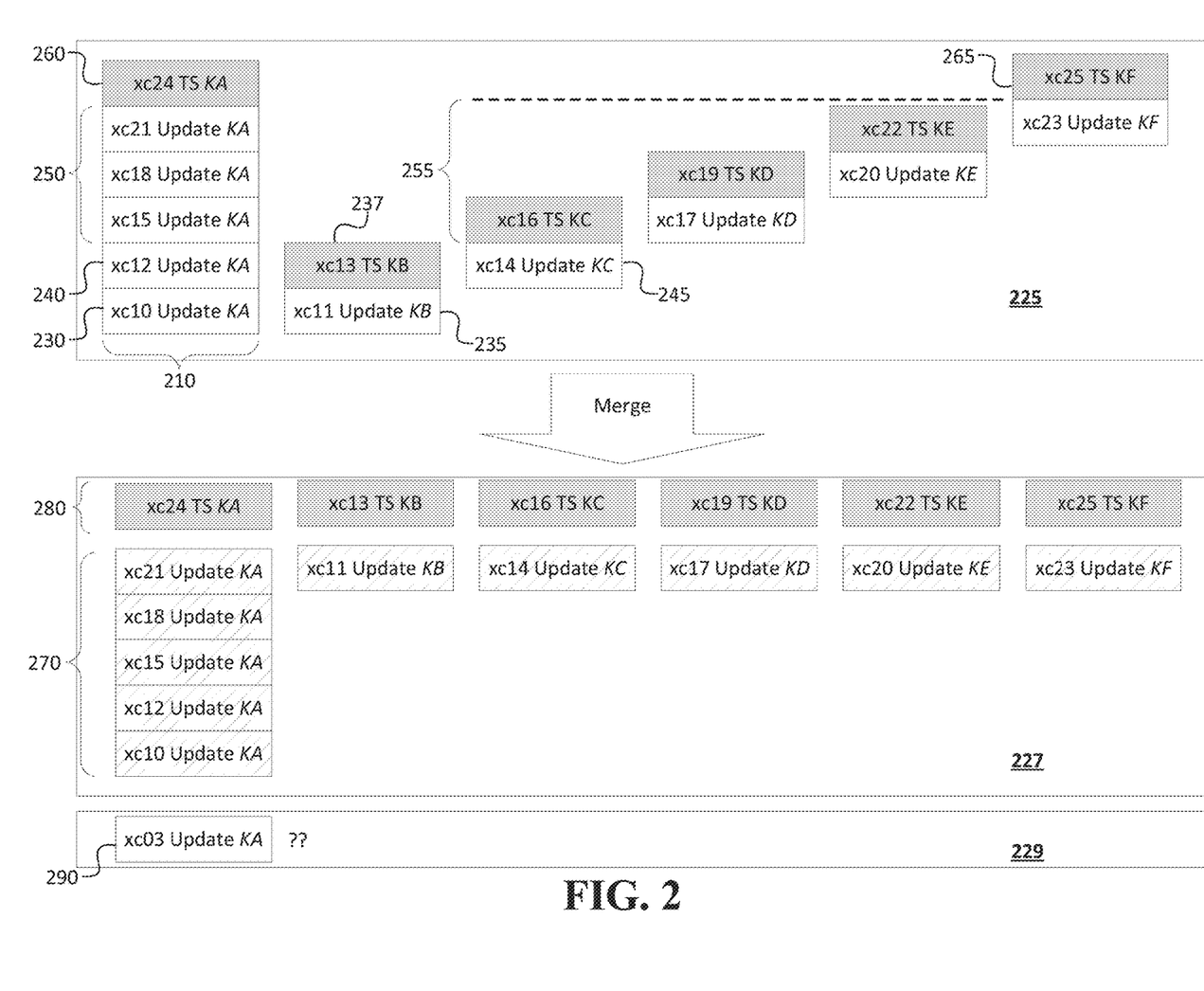
FIG. 2 shows a series of transactions in a conventional tombstone removal process.

To describe the disclosed embodiments, it is instructive to compare the disclosed early tombstone removal process against a conventional tombstone removal process. FIG. 2 shows a conventional process for the gradual removal of tombstones from an LSM-tree-based storage system. As previously mentioned, through flush and merge operations data (e.g., records and tombstones) in system migrate "down" through virtual levels from the memory storage (new data) to the extents in the physical storage (older data). In a conventional LSM tree based storage system, tombstones are not removed until they reach the lowest level of the physical storage, where the oldest records are stored.

FIG. 2 depicts a series of transactions in a memory storage 225 and a subsequent merge operation to physical storage extent 227. A record 230 having key KA and transaction number xc10 is inserted into a base table row 210, and a corresponding record 235 having key KB and an incrementally higher transaction number xc1 is entered in a secondary index. When the record 230 is updated (i.e., in a new transaction), a new record 240 is entered in the base table row 210. The new record 240 has the same key KA as the previous record 230, but also an updated value (not shown) and the next incremental transaction number xc12. The update prompts the insertion of a tombstone 237 to mark the deletion of the secondary index record 235, and the insertion of a new secondary index record 245.

Over time, multiple updates 250 may occur, resulting in additional tombstones and updated secondary index records 255. Finally, the updated record is marked for deletion with a tombstone 260, and a corresponding tombstone 265 is added for the corresponding secondary index record. When the system executes a flush operation to push data out of the memory storage 225 to a physical storage extent 227, the obsolete update records 270 do not need to be carried forward to the physical storage extent 227. They are discarded and not written forward. However, each of the most recent records, in this case tombstones (e.g., 260, 237, 265), are carried forward. As such, tombstones 280 are stored in extent 227.

In the flush operation depicted in FIG. 2, even though each of the records 280 are tombstones, in a conventional system they cannot be discarded. Tombstones essentially block or prevent any previous record with the same key as the tombstone from being read by the system. The tombstones 280 cannot be discarded as long as there is any possibility that additional records having the same key as one of the tombstones 280 are still stored somewhere further down the virtual levels of storage. For example, it is unknown whether a previous merge operation from extent 227 to extent 229 resulted in a record 290 for key KA being written to extent 229. If record 290 exists in extent 229, then discarding the tombstone 280 would cause record 290 to be accessible in readout. For this reason, in a conventional system tombstones matriculate through the system until they reach the lowest level (i.e., last) extent in physical storage. Only at that point can the system be assured that no prior records exist that need to be blocked by the tombstone.

Accordingly, a conventional merge operation to a target extent is as follows:
1) Select a range of records (e.g., based on a temporal parameter, such as XCN)
2) Add records having a same key from within the range to a duplicate set (buffer) in a temporal order
3) Retain the newest record R from the duplicate set; retain the remaining duplicate set records as a prune set
4) Discard the prune set by not writing those records to the target extent
5) Discard R if it is a tombstone and the target extent is the lowest level extent in the system; otherwise, write R to the target extent.

As shown in FIG. 2, this merge process can result in an accumulation of tombstones throughout the physical storage until the tombstones finally reach the lowest level extent where they can be safely discarded. In many database applications this result is detrimental, can have a negative effect on system operational speed, and takes up storage space that could otherwise be used to store content data. Furthermore, some database services can rapidly generate excessively large numbers of unnecessary tombstones, such as a message que service in which the time between insertion and deletion of high numbers of records is relatively short.

Figure 3:
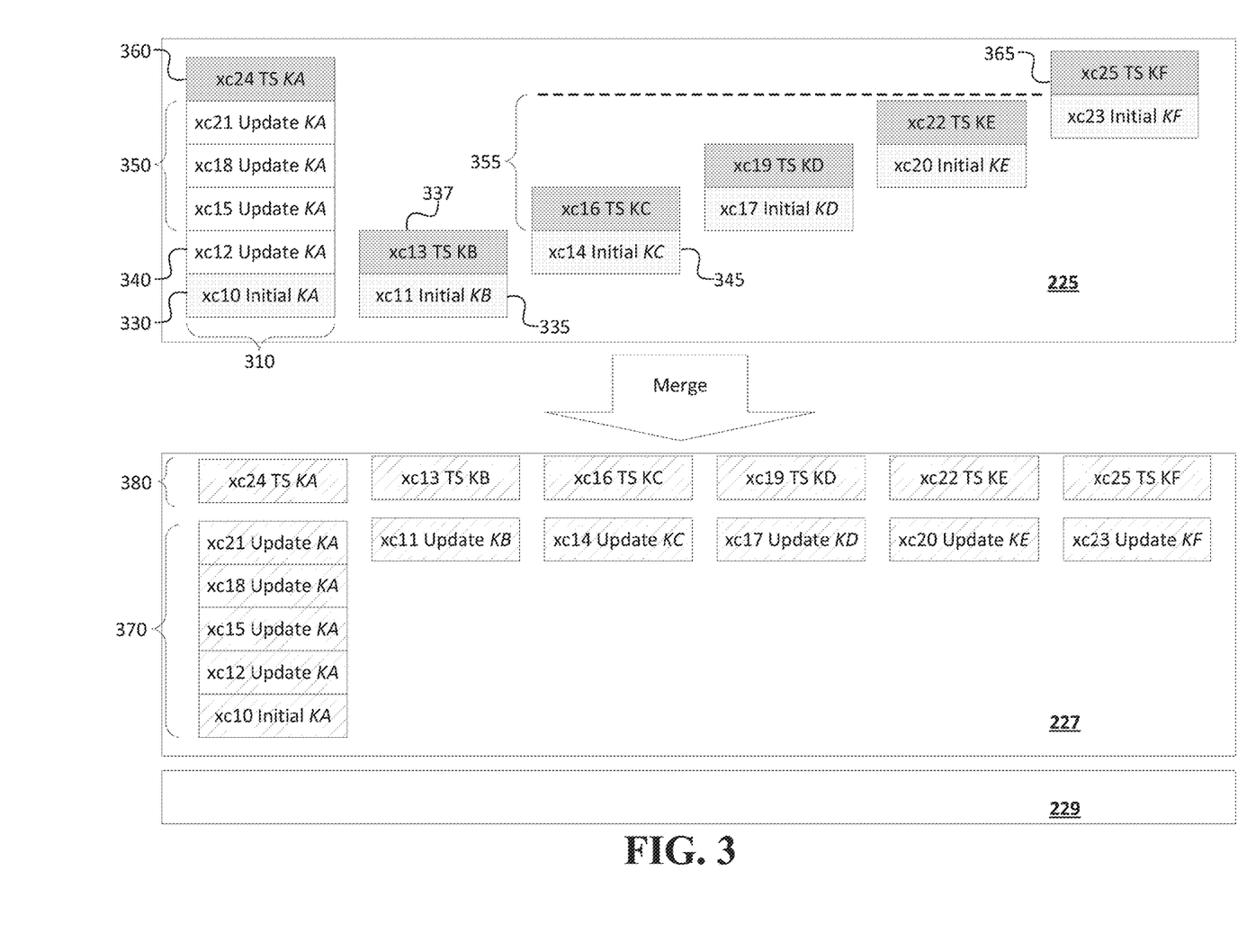
FIG. 3 shows a series of transactions in a tombstone removal process according to an implementation of the disclosed subject matter.

FIG. 3 depicts a computer-implemented process according to the presently disclosed subject matter to enable early removal of tombstones from a storage system. When a record 330 is initially inserted into a base row table 310 of memory storage 225, the system first checks to ensure that no other active record (i.e., record not marked for deletion) associated with key KA exists in the system. If no other record is found, the record 330 is marked with an "initial flag," indicating that it is the current first and earliest active record associated with the key KA.

Thus, in this example an initial record 330 having key KA and transaction number xc10 is inserted into a base table row 310, and a corresponding initial record 335 having key KB and an incrementally higher transaction number xc11 is entered in a secondary index. When the record 330 is updated (i.e., given a different value in a new transaction), a new record 340 is entered in the base table row 310. The new record 340 is an update, not an initial record, since initial record 330 is already associated with the key KA. Therefore, the "initial flag" for update record 340 is left at value 0.

Update record 340 has the same key KA as the initial record 330, but stores an adjusted value (not shown) and the next incremental transaction number xc12. The update prompts the insertion of a tombstone 337 to mark the deletion of the secondary index record 335. Tombstone 337 renders initial secondary index record 335 inactive (i.e., effectively deleted). The insertion of a new secondary index record 345 is marked by an "initial flag."

Over time, multiple updates 350 may occur, resulting in additional tombstones and new initial secondary index records 355. Finally, the updated record is marked for deletion with a tombstone 360, and a corresponding tombstone 365 is added for the corresponding secondary index record.

In this situation when the system executes a flush/merge operation, all of the obsolete update records 370 need not be carried forward to the physical storage extent 227, so they are discarded and not written forward. However, unlike in the conventional system, the disclosed system can determine whether the remaining tombstones need to be carried forward or can also be discarded. An embodiment of the disclosed merge operation that automatically determines whether a tombstone can be discarded early follows:

1) Select a range of records (e.g., based on a temporal parameter, such as XCN);
2) Add records having a same key from within the range to a duplicate set (buffer) in a temporal order;
3) Retain the newest record R from the duplicate set; retain the remaining duplicate set records as a prune set;
4) Discard R if it is a tombstone and the target extent is the lowest level extent in the system;
5) Discard R if it is a tombstone and the oldest record in the prune set is an initial record;
6) Discard R if the prune set is empty and R is both a tombstone and an initial record;
7) Discard the prune set records by not writing them to the target extent;
8) If R is not discarded and R is not a tombstone, write R to the target extent inheriting the initial flag setting of the oldest record in the prune set; and
9) If R is not discarded and R is a tombstone, write R to the target extent marked as a tombstone.

Applying the above-listed operational process to the situation depicted in FIG. 3, the selected range of records can be determined based records on having associated transaction times that are after a point in time Tat which a scan operation began. For example, in this case the range can include transaction numbers (XCN) xc10-xc25. For key KA, the newest record R in the duplicate set is xc24 TS KA. The oldest record in the prune set is xc10 Initial KA. Accordingly, in this instance operation number 5 listed above is triggered and R can be discarded. Applying the operations to the full designated XCN range, all of the records 370, 380 are discarded and none are written to extent 227.

In contrast to the conventional system, in this situation the tombstones can safely be discarded by the currently disclosed system because the disclosed system can accurately determine that the tombstones are no longer needed. The scan for additional records using the keys KA, KB has already taken place at the time the initial flags were set (i.e., for records 330, 335, 345, etc.). The initial flags indicate that no older active records exist for keys KA-KF. Therefore, the only records that the tombstones 360, 337, are needed for blocking access to are all within the range of the duplicate set, and those will all be discarded in the current merge.

Accordingly, the disclosed computer-implemented processes embodiments can safely and automatically discard tombstones prior to the tombstones reaching the lowest level extent, thereby improving the system by freeing additional storage space and improving operational speed of the system.

Figure 4A:
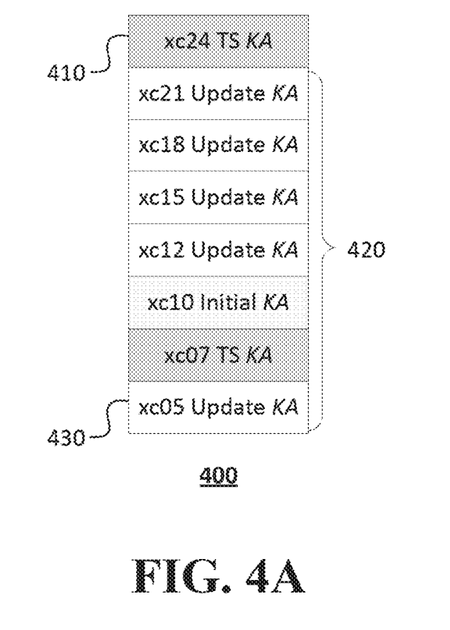
FIG. 4A shows an example duplicate set to be resolved according to an implementation of the disclosed subject matter.

FIGS. 4A, 4B, 5A and 5B depict scenarios of duplicate sets that the disclosed computer-implemented process embodiments can resolve in a merge operation. In FIG. 4A, the newest record R in the duplicate set 400 is a tombstone 410. The prune set 420 will include the remaining records from the duplicate set 400. The oldest record in the prune set 420 is the update record 430. In this case, since the oldest record is not marked as an initial record and R is not marked as both a tombstone and initial record, the system will preserve a tombstone record for key KA and discard the remaining records, unless the target extent is a lowest level extent, in which case both R and the prune set can be discarded.

Figure 4B:
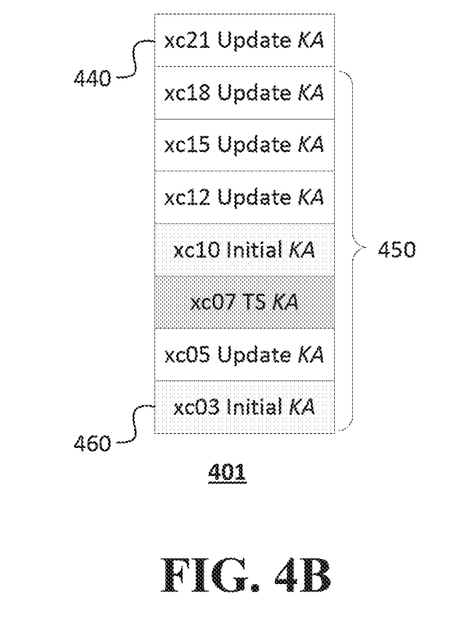
FIG. 4B shows another example duplicate set to be resolved according to an implementation of the disclosed subject matter.

In FIG. 4B the newest record R in the duplicate set 401 is an updated record 440. The prune set 450 will include the remaining records from the duplicate set 401. In this case, although the oldest record in the prune set 450 is an initial record 460, since R is not a tombstone record the prune set 450 will be discarded and R will be written to the target extent marked as an initial record.

Figure 5A:
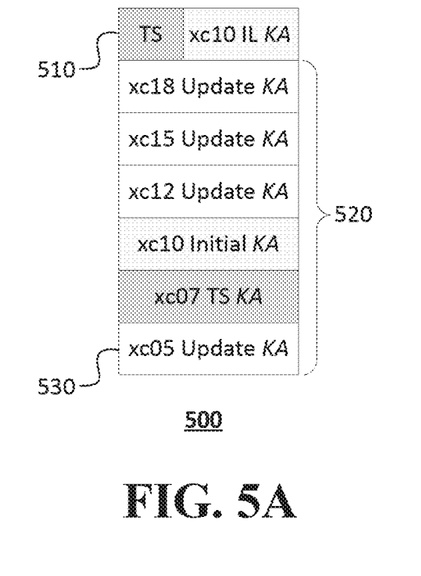
FIG. 5A shows another example duplicate set to be resolved according to an implementation of the disclosed subject matter.

In FIG. 5A the newest record R in the duplicate set 500 is record 510, which is marked as both an initial record and a tombstone. This can occur when a record is inserted and then marked for deletion in the same transaction. The oldest record in the prune set 520 is an updated record 530. Since record 530 is not marked as an initial record, a tombstone record for key KA will be written forward to the target extent. That is, in this case although R is also an initial record, the tombstone flag takes precedence in determining which flag to carry forward.

Figure 5B:
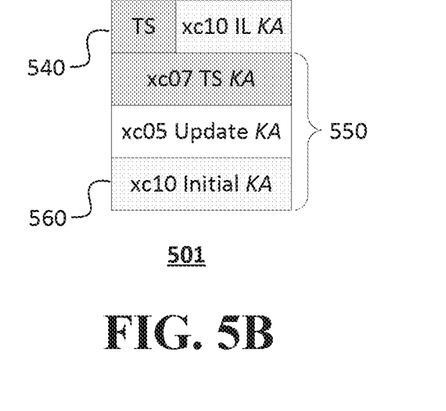
FIG. 5B shows another example duplicate set to be resolved according to an implementation of the disclosed subject matter.

In FIG. 5B the newest record R in the duplicate set 501 is record 540, which is again marked as both an initial record and a tombstone. However, in this case the oldest record in the prune set 550 is marked as an initial record 560. Accordingly, both R and the prune set 550 can be discarded.

Figure 6:
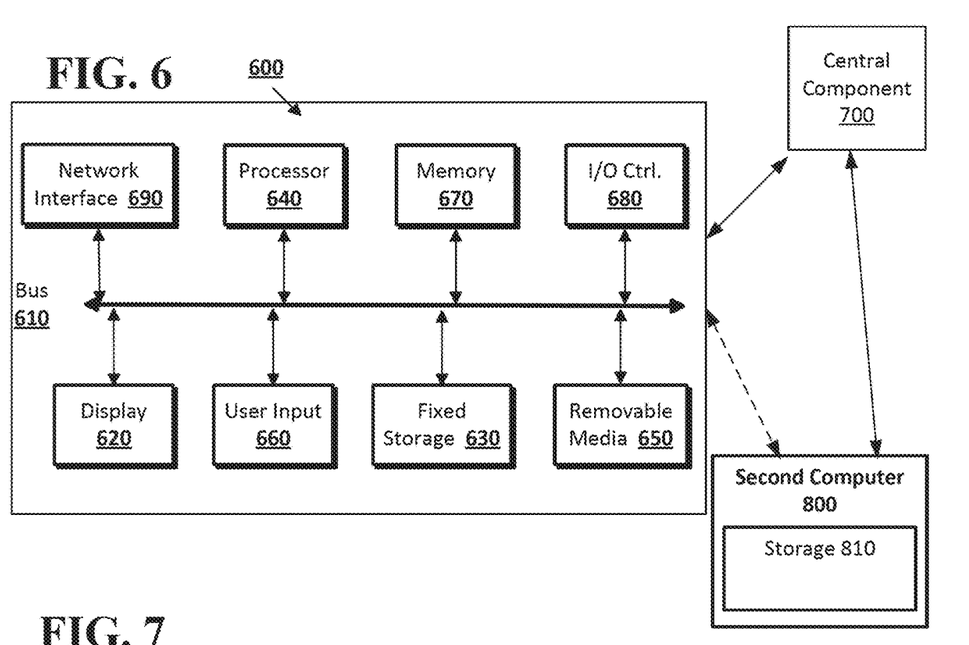
FIG. 6 shows a computer according to an implementation of the disclosed subject matter.

Implementations of the presently disclosed subject matter may be implemented in and used with a variety of component and network architectures. FIG. 6 is an example computer 600 suitable for implementing implementations of the presently disclosed subject matter. The computer 600 may be a single computer in a network of multiple computers. As shown in FIG. 6, the computer 600 may communicate with a central or distributed component 700 (e.g., server, cloud server, database, cluster, application server, etc.). The central component 700 may communicate with one or more other computers such as the second computer 800, which may include a storage device 810. The second computer 800 may be a server, cloud server, or the like. The storage 810 may use any suitable combination of any suitable volatile and non-volatile physical storage mediums, including, for example, hard disk drives, solid state drives, optical media, flash memory, tape drives, registers, and random access memory, or the like, or any combination thereof.

Figure 7:
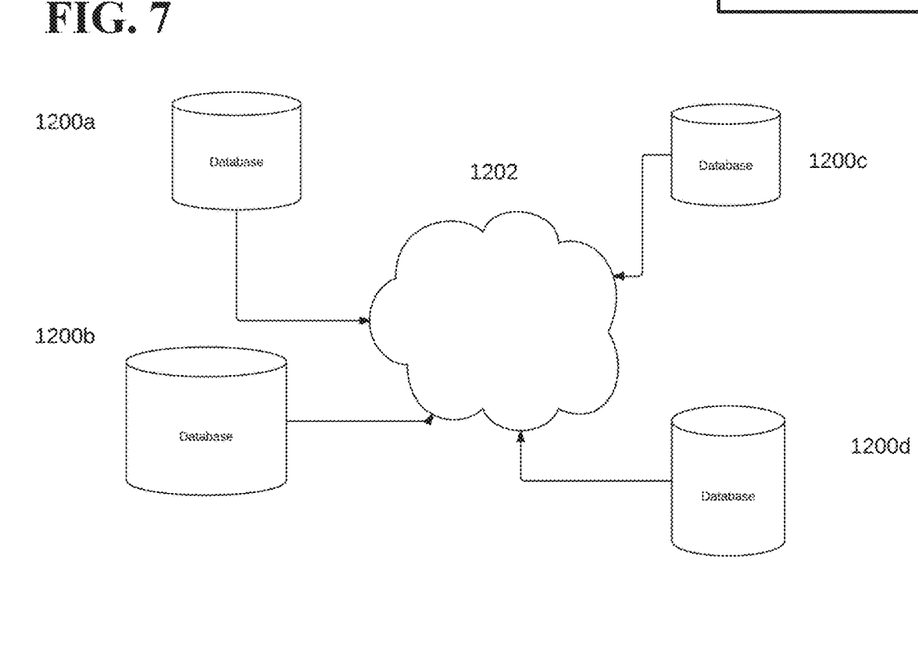
FIG. 7 shows a network configuration according to an implementation of the disclosed subject matter.

Data, such as the records discussed above, may be stored in any suitable format in, for example, the storage 810, using any suitable filesystem or storage scheme or hierarchy. For example, the storage 810 may store data using a log structured merge (LSM) tree with multiple levels as described above. Further, if the systems shown in FIGS. 6-7 are multitenant systems, the storage may be organized into separate log structured merge trees for each instance of a database for a tenant. Alternatively, contents of all records on a particular server or system may be stored within a single log structured merge tree, in which case unique tenant identifiers associated with versions of records may be used to distinguish between data for each tenant. More recent transactions may be stored at the highest or top level of the tree and older transactions may be stored at lower levels of the tree. Alternatively, the most recent transaction or version for each record may be stored at the highest level of the tree and prior versions or prior transactions at lower levels of the tree.

The information obtained to and/or from a central component 700 may be isolated for each computer such that computer 600 may not share information with computer 800. Alternatively or in addition, computer 600 may communicate directly with the second computer 800.

The computer (e.g., user computer, enterprise computer, etc.) 600 includes a bus 610 which interconnects major components of the computer 600, such as a central processor 640, a memory 670 (typically RAM, but which may also include ROM, flash RAM, or the like), an input/output controller 680, a user display 620, such as a display or touch screen via a display adapter, a user input interface 660, which may include one or more controllers and associated user input or devices such as a keyboard, mouse, WiFi/cellular radios, touchscreen, microphone/speakers and the like, and may be closely coupled to the I/O controller 680, fixed storage 630, such as a hard drive, flash storage, Fibre Channel network, SAN device, SCSI device, and the like, and a removable media component 650 operative to control and receive an optical disk, flash drive, and the like.

The bus 610 enable data communication between the central processor 640 and the memory 670, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 600 can be stored on and accessed via a computer readable medium, such as a hard disk drive (e.g., fixed storage 630), an optical drive, floppy disk, or other storage medium 650.

The fixed storage 630 may be integral with the computer 600 or may be separate and accessed through other interfaces. A network interface 690 may provide a direct connection to a remote server via a telephone link, to the Internet via an internet service provider (ISP), or a direct connection to a remote server via a direct network link to the Internet via a POP (point of presence) or other technique. The network interface 690 may provide such connection using wireless techniques, including digital cellular telephone connection, Cellular Digital Packet Data (CDPD) connection, digital satellite data connection or the like. For example, the network interface 690 may enable the computer to communicate with other computers via one or more local, wide-area, or other networks, as shown in FIG. 7.

Many other devices or components (not shown) may be connected in a similar manner (e.g., data cache systems, application servers, communication network switches, firewall devices, authentication and/or authorization servers, computer and/or network security systems, and the like). Conversely, all of the components shown in FIG. 6 need not be present to practice the present disclosure. The components can be interconnected in different ways from that shown. Code to implement the present disclosure can be stored in computer-readable storage media such as one or more of the memory 670, fixed storage 630, removable media 650, or on a remote storage location.

FIG. 7 shows an example network arrangement according to an implementation of the disclosed subject matter. Four separate database systems 1200*a-d* at different nodes in the network represented by cloud 1202 communicate with each other through networking links 1204 and with users (not shown). Each of database systems 1200 may be operable to host multiple instances of a database, where each instance is accessible only to users associated with a particular tenant. Each of the database systems may constitute a cluster of computers along with a storage area network (not shown), load balancers and backup servers along with firewalls, other security systems, and authentication systems. Some of the instances at any of systems 1200 may be live or production instances processing and committing transactions received from users or from computing elements (not shown) for ingesting and providing data for storage in the instances.

The database systems, for example 1200*c*, may include at least one storage device, such as in FIG. 6. For example, the storage may include memory 670, fixed storage 630, removable media 650, a storage device included with the central component 700 and/or the second computer 800, and/or one or more storage devices associated with one or more of the database systems 1200*a*-1200*d*.

In some implementations, the one or more servers shown in FIGS. 6-7 may store the data in an immutable storage of the at least one storage device (e.g., a storage device associated with central component 700, the second computer 800, and/or the database systems 1200*a*-1200*d*) using a log-structured merge tree data structure.

The systems and methods of the disclosed subject matter may be for single tenancy and/or multi-tenancy systems. Multi-tenancy systems may allow various tenants, which may be, for example, users, groups of users, or organizations, to access their own records on the server system through software tools or instances on the server system that may be shared among the various tenants. The contents of records for each tenant may be part of a database for that tenant. Contents of records for multiple tenants may all be stored together within the same server system, but each tenant may only be able to access contents of records which belong to, or were created by, that tenant. This may allow a server system to enable multi-tenancy without having to store each tenants' contents of records separately, for example, on separate servers or server systems. The database for a tenant may be, for example, a relational database, hierarchical database, or any other suitable database type. All records stored on the server system may be stored in any suitable structure, including, for example, a LSM tree.

Further, a multitenant system may have various tenant instances on server systems distributed throughout a network with a computing system at each node. The live or production database instance of each tenant may have its transactions processed at one specific computer system. The computing system for processing the transactions of that instance may also process transactions of other instances for other tenants.

Some portions of the detailed description are presented in terms of diagrams or symbolic representations of operations on data within a computer memory. These diagrams, descriptions and representations are commonly used by those skilled in the data processing arts to most effectively convey the substance of their work to others skilled in the art. A computer-implemented process is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "writing," "reading," "receiving," "transmitting," "modifying," "updating," "sending," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Still more generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method of deleting one or more records from a log-structured merge (LSM) tree based storage system during a merge operation, comprising:
  entering an initial record in a primary index of a virtualization layer of the storage system and a corresponding initial record in a secondary index of the virtualization layer of the storage system;
  setting an initial-flag in the initial record in the primary index of the virtualization layer of the storage system, the initial-flag indicating that the initial record is a current first and earliest active record associated with a first key that is not associated with any other active record;
  entering a plurality of update records into the primary index, wherein each update record of the plurality of update records stores a respective adjusted value to the initial record;
  inserting in the secondary index, based on entering each update record of the plurality of update records into the primary index, a data deletion marker, and a successive corresponding initial record, wherein each of the data deletion markers marks a previous corresponding initial record in the secondary index to be deleted from the storage system during the merge operation;
  setting a final data deletion marker in a second record in the primary index of the virtualization layer of the storage system, the second record being associated with the first key and the final data deletion marker indicating that a value associated with the first key is designated to be deleted from the storage system during the merge operation;
  selecting a set of one or more records in the virtualization layer of the storage system to be written to an extent of a physical storage layer of the storage system in the merge operation, each of the one or more records being associated with the first key;
  discarding, before performing the merge operation, from the set of one or more records, the data deletion markers and the final data deletion marker and the second record based at least in part on a determination that
    the initial record having the initial-flag set is an oldest record in the set of one or more records and
    the second record having the final data deletion marker set is a newest record in the set of one or more records; and
  performing the merge operation to write a remaining set of non-discarded records of the set of one or more records to the extent of the physical storage layer of the storage system.

2. The method of claim 1, wherein the first initial record and the second record are the same record, being the only records in the set.

3. The method of claim 1, wherein the set of one or more records are all selected based on having associated transaction times that are after a point in time T at which a scan operation began.

4. The method of claim 1, further comprising setting an initial flag in a third record when the third record is the oldest record in the set and the merge operation writes records into a lowest extent in the storage system.

5. The method of claim 1, further comprising, prior to setting the initial-flag in the initial record:
  executing a search for active records having a same key as the initial record in the storage system; and
  setting the initial flag of the initial record when the search yields no records stored in the storage system having the same key as the initial record.

6. The method of claim 5, wherein the search and determination of setting the initial-flag in the initial record occurs when the initial record is inserted into the storage system.

7. A storage system, comprising:
  at least one memory storing computer-executable instructions;

a database storing a plurality of records; and at least one processor, wherein the at least one processor is configured to access the at least one memory and to execute the computer-executable instructions to:

entering an initial record in a primary index of a virtualization layer of the storage system and a corresponding initial record in a secondary index of the virtualization layer of the storage system;

set an initial-flag in the initial record in the primary index of the virtualization layer of the storage system, the initial-flag indicating that the initial record is a current first and earliest active record associated with a first key that is not associated with any other active record;

enter a plurality of update records into the primary index, wherein each update record of the plurality of update records stores a respective adjusted value to the initial record;

insert in the secondary index, based on entering each update record of the plurality of update records into the primary index, a data deletion marker, and a successive corresponding initial record, wherein each of the data deletion markers marks a previous corresponding initial record in the secondary index to be deleted from the storage system during the merge operation;

set a final data deletion marker in a second record in the primary index the virtualization layer of the storage system, the second record being associated with the first key and the final data deletion marker indicating that a value associated with the first key is designated to be deleted from the storage system during the merge operation;

select a set of one or more records in the virtualization layer of storage system to be written to an extent of a physical storage layer of the storage system in the merge operation, each of the one or more records being associated with the first key;

discard, before performing the merge operation, from the set of one or more records, the first data deletion markers and the final data deletion marker and the second record based at least in part on a determination that
        the initial record having the initial-flag set is an oldest record in the set of one or more records and
        the second record having the final data deletion marker set is a newest record in the set of one or more records; and     perform the merge operation to write a remaining set of non-discarded records of the set of one or more records to the extent of the physical storage layer of the storage system.

8. The storage system of claim 7, wherein the initial record and the second record are the same record, being the only records in the set.

9. The storage system of claim 7, wherein the set of one or more records are all selected based on having associated transaction times that are after a point in time Tat which a scan operation began.

10. The storage system of claim 7, wherein the processor is further configured to set an initial flag in a third record when the third record is the oldest record in the set and the merge operation writes records into a lowest extent in the storage system.

11. The storage system of claim 7, wherein the process is further configured to, prior to setting the initial-flag in the initial record:

execute a search for active records having a same key as the initial record in the storage system; and     set the initial flag of the initial record when the search yields no records stored in the storage system having the same key as the initial record.

12. The storage system of claim 11, wherein the search and determination of setting the initial-flag in the initial record occurs when the initial record is inserted into the storage system.

* * * * *